(12) United States Patent
Morper et al.

(10) Patent No.: US 10,326,695 B2
(45) Date of Patent: Jun. 18, 2019

(54) ULTRA HIGH-SPEED MOBILE NETWORK BASED ON LAYER-2-SWITCHING

(71) Applicant: NOKIA SOLUTIONS AND NETWORKS OY, Espoo (FI)

(72) Inventors: Hans-Jochen Morper, Erdweg (DE); Maximilian Riegel, Nürnberg (DE)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 94 days.

(21) Appl. No.: 15/322,272

(22) PCT Filed: Jun. 27, 2014

(86) PCT No.: PCT/EP2014/063718
§ 371 (c)(1),
(2) Date: Dec. 27, 2016

(87) PCT Pub. No.: WO2015/197136
PCT Pub. Date: Dec. 30, 2015

(65) Prior Publication Data
US 2017/0171068 A1    Jun. 15, 2017

(51) Int. Cl.
*H04L 12/721* (2013.01)
*H04L 29/12* (2006.01)
(Continued)

(52) U.S. Cl.
CPC .............. *H04L 45/66* (2013.01); *H04L 29/12* (2013.01); *H04L 45/74* (2013.01); *H04L 49/602* (2013.01);
(Continued)

(58) Field of Classification Search
CPC ......... H04L 45/66; H04L 29/12; H04L 45/74; H04L 49/602; H04L 61/103
See application file for complete search history.

(56) References Cited

U.S. PATENT DOCUMENTS 9,575,782 B2 *   2/2017   Chandrashekhar ... H04L 45/741
2004/0184418 A1 *  9/2004   Benning ............. H04L 29/1216
                                                      370/328
(Continued)

FOREIGN PATENT DOCUMENTS

CN            103270736 A        8/2013

OTHER PUBLICATIONS

International Search Report and Written Opinion dated Mar. 11, 2015 corresponding to International Patent Application No. PCT/EP2014/063718.
(Continued)

*Primary Examiner* — Chi H Pham
*Assistant Examiner* — Weibin Huang
(74) *Attorney, Agent, or Firm* — Squire Patton Boggs (US) LLP

(57) ABSTRACT

Ultra High-Speed Mobile Network based on Layer-2 Switching The present invention provides apparatuses, methods, computer programs, computer program products and computer-readable media regarding Ultra High-Speed Mobile Network based on Layer-2 Switching. Certain aspects of the present invention include receiving, at a first gateway, a data packet from a first host served by the first gateway destined to a second host served by a second gateway, the data packet having a header comprising a layer 3 destination address of the second host and a broadcast layer 2 destination address, searching, by the first gateway, a flow table stored in the first gateway for an identity of the second gateway associated with the layer 3 destination address of the second host, if the identity is found in the flow table, replacing the broadcast layer 2 destination address with the identity of the second gateway serving the second host, and transmitting the data packet to the second gateway.

5 Claims, 17 Drawing Sheets

(51) Int. Cl.
  *H04L 12/741* (2013.01)
  *H04L 12/931* (2013.01)
  *H04L 12/46* (2006.01)

(52) U.S. Cl.
  CPC .... *H04L 61/103* (2013.01); *H04L 2012/4629* (2013.01)

(56) References Cited

U.S. PATENT DOCUMENTS

| | | | | |
|---|---|---|---|---|
| 2009/0199291 | A1* | 8/2009 | Hayasaka | H04L 63/0227 726/14 |
| 2010/0322076 | A1* | 12/2010 | Goel | G06F 9/505 370/236 |
| 2012/0008528 | A1* | 1/2012 | Dunbar | H04L 12/462 370/255 |
| 2012/0014386 | A1 | 1/2012 | Xiong et al. | |
| 2013/0315246 | A1 | 11/2013 | Zhang et al. | |
| 2014/0334490 | A1* | 11/2014 | Nakata | H04L 69/08 370/392 |
| 2015/0010016 | A1* | 1/2015 | Janardhanan | H04L 45/04 370/466 |

OTHER PUBLICATIONS

IEEE Standard 802.3—2012 (Revision of IEEE Std 802.3—2008); IEEE Standard for Ethernet; Dec. 28, 2012, 634 pages.

IEEE Standard 802.11—2012; IEEE Standard for Information Technology—Telecommunications and information exchange between systems—Local and metropolitan area networks—Specific requirements; Part 11: Wireless LAN Medium Access Control (MAC) and Physical Layer (PHY) Specifications, IEEE Computer Society, Mar. 29, 2012.

* cited by examiner

ULTRA HIGH-SPEED MOBILE NETWORK BASED ON LAYER-2-SWITCHING

FIELD OF THE INVENTION

The present invention relates to apparatuses, methods, systems, computer programs, computer program products and computer-readable media regarding Ultra High-Speed Mobile Network based on Layer-2 Switching.

BACKGROUND OF THE INVENTION

This present invention leverages several technology fields for the design of a novel mobile network, like IT (information technology) connectivity principles, telco (telecommunication) transport, mobile network architecture, cloud computing and software defined network. Therefore, each of the fields shall be shortly strived with respect to its relevance for this present invention.

IT End-to-End Networking Principles

Today, IT networks comprise a set of interconnected access networks, commonly named local area networks (LAN), where connectivity is mainly based on layer 2 Ethernet. FIG. 1 shows an example of an IT network, where hosts (HA, HB) are connected to the LAN either by wire (see right part of FIG. 1) or wirelessly (left part) via a Wireless LAN (WLAN) access point. Those hosts may consist of e.g. a notebook with some application running on it, e.g. a web browser fetching content by use of the HTTP protocol, or a server running a web server to provide content by supporting the HTTP protocol. The applications on hosts communicate with servers, which are connected as peer hosts to the same or a separate LAN following the same connection principles. Host to host communication is based on layer 3 functionalities, commonly the Internet Protocol and IP addresses.

Since the range of a layer 2 network (LAN) is typically limited to a couple of thousand hosts, the interconnection between larger networks, i.e. various LANs is based on forwarding according to layer 3 IP addresses. Host IP addresses have a network wide significance. In order to guarantee proper assignment of IP addresses to hosts and in order to forward data packets from one LAN (layer 2 addressing) via a routed network (layer 3 addressing, see middle of FIG. 1) to another LAN (layer 2 addressing) to the peer host, access routers are placed at each LAN's edge to forward packets between LANs based on IP addresses.

The access router's main tasks (with respect to this present invention) comprise of (I) intercept packets with locally unique IP addresses of hosts that attach to this LAN addressed to IP addresses falling outside of the local address range, and (II) to forward those packets to the access router, which takes care of the local IP addresses of the peer host, which is located in a different LAN. Consequently, packets received from peer hosts to host attached to the LAN as recipient, are interworked in the reverse order.

Intra LAN communication is solely done based on layer 2 forwarding, deploying Ethernet MAC addresses for identification of the end station (see bottom of FIG. 1) and using IEEE 802.3 Ethernet, or IEEE 802.11 in case of wireless LAN links, for the physical transport. The layer 1 and layer 2 tunneling of long haul connections between the LANs may be based on various (also non-Ethernet) technologies including optical transport, indicated by link layer control LLC and physical layer PHY.

While layer 2 forwarding is used for communication between stations within a LAN, layer 3 (IP) is used for forwarding/routing between the peer hosts potentially traversing multiple LANs.

In an access router, typically a DHCP (Dynamic Host Configuration Protocol) server function will assign local IP addresses to hosts which are connecting to it.

When the DHCP server located in the access router assigns an IP address to a host, it will also provide a network mask that indicates the range of IP addresses that are used in this local area network. This allows a host to distinguish whether or not a peer host is in the same LAN or not.

Fixed and Mobile (Telco) End-to-End Networks

FIG. 2 shows the basic architecture of a mobile network. In a simplified view, a mobile network comprises of five domains:

User Equipment UE. Those may range from simple cellular mobile phones over smart phones to wireless notebooks;

Radio Access Network RAN comprising of base stations, antennas, everything that is there to provide radio access;

Mobile Core. This includes facilities necessary to handle user authentication and authorization, where user subscription data is stored (HSS home subscriber system);

Service Delivery Framework SDF. This comprises of servers for mobile operator content and services including content delivery functions like cashing;

Backend System. Here are the network management facilities and billing and charging systems.

In addition, there are two edges—between RAN and core and between core and world wide services networks.

The RAN/core edge comprises of facilities which are mobile network generation dependent, i.e. in a 2G network (GSM) those comprise of base station controllers BSC which control bundles of base stations (e.g. for paging), in case of 3G (UMTS) those are radio network controllers RNC with much more complexity (terminating parts of the radio layer, performing soft combining). In a 4G network (LTE) there is no edge function since the function split again changed significantly with packet based (IP or Ethernet) connections from base station to the core and all radio layers terminated in the base station (eNodeB) and with mobility management moving to the core network into Mobility Management Entity MME.

The core/services networks edge comprises of entities which handle the communication between the mobile network and the outside world. Mobile Switching Centers MSC handle narrowband circuit switched voice traffic (and MSC-Servers and media gateways Voice-over-IP based communication, not shown in FIG. 2). Packet data access to/from services networks (internet) is handled by a GPRS Gateway Serving Node GGSN or by a Servicing/Packet Gateway S/P-Gw in case of 4G LTE.

Edge nodes like RNC or GGSN are unique points in the network since all traffic (at least all packet data traffic, i.e. all internet traffic) runs through them. Due to their complexity their numbers are limited per network so that there are a few crucial topological points in the network which are single points of failure and which may become performance bottlenecks as traffic increases significantly (200 times in 10 years).

According to this simplified architecture, a broadband fixed network architecture can be drawn alike (no shown). Here the Access Network can have a DSL Access Multiplexer DSLAM as an edge node (which terminates the physical layer towards the DSL modems) and a Broadband Remote Access Server BRAS as a core/services network edge node.

Network Virtualization, Virtual Machines, Cloud Computing

A major trend in telecommunications, also in mobile networks, especially in the core is to use data center technologies for running applications. One motivation of that is to reduce TCO (total cost of ownership) since one platform (data center) can be used for many (most) applications that by today are often running on distinct network nodes. Furthermore, it allows a better scaling and more elasticity since applications can be invoked and terminated flexibly according to networking demands. FIG. 3 shows a typical setup of a data center and its management entities.

The data center itself comprises of hardware including multi core processing units and switching facilities (D-Switch in FIG. 3) to interconnect different processing units on the multiple blades in the multiple racks that make up a data center. The multiple computing parts will be equipped with an operating system (host OS, e.g. Linux) on which one or several virtual machines VM can be established. These VMs may be equipped with application software running on top of yet another operating system (guest OS, e.g. Linux, Windows). The control of the different VMs is done by a piece of HiperVisor HV middleware which acts as a mediator between the guest OS/VM and the host operating system hiding the virtual nature of the platform to the guest OS.

Virtual machines will be invoked/terminated and equipped with software images by an Infrastructure-as-a-service (IaaS) component, also denoted as Cloud Management System. On demand (of e.g. a cloud orchestration system) a specific software image (which may also include the guest OS) out of a list of software images that is stored in a database will be started on a virtual machine. The selection of the VM is done and controlled by this entity.

The Cloud Orchestration Function, e.g. NSN Cloud Application Manager CAM, stores templates for specific software that shall be deployed in a network which are stored in yet another database. Those templates comprise e.g. of information about how many applications make up a network function (e.g. three applications together form a voice communication server VCS), which of the images that are stored in the IaaS database do reflect this application(s), the starting order of the different applications, IDs that allow to identify running applications and more. Per screen level command or triggered by an external network control (e.g. via http based interface) or by an orchestrator as defined in ETSI NFV (European Telecommunications Standards Institute Network Functions Virtualization) new applications can be started/stopped/modified and monitored. The Cloud Orchestration System will communicate with the IaaS or cloud management system, respectively, and directly/indirectly with the application. Yet those interfaces are still subject of standardization, current solutions employ Quantum, OpenStack and Eucalyptus and derivates of those.

Software Defined Networks—SDN Transport

Another trend is gaining momentum in CSP networks, SDN—the decoupling of data forwarding and control.

By today, typical nodes in transport networks comprise of specific functionalities. A router, for example, comprises of data switching functionalities which move data packets between the different I/O ports. But it also handles all the complex routing protocols like RSVP (resource reservation protocol), it holds routing tables and more. All the complex functionality and the switching are encapsulated in one box.

Another example would be a carrier Ethernet switch, providing data forwarding and control on layer 2. And more and more multilayer switches are used in transport networks providing MPLS (multi protocol label switching) functionality which on top of the before mentioned router or switch functionality provide MPLS/G-MPLS signaling capability. Bottom line, depending for what purpose a transport node is used, it is more or less complex providing data forwarding and control function in one monolithic node.

The basic idea of SDN is to decouple control functions from data forwarding functions, in other words, everything that makes a router being a router and everything that makes a switch being a switch is taken out of a node, let's call it network element NE and put it into a controller. What will be remaining in the NE is pure data forwarding functionality. With this philosophy, routers, switches, MPLS nodes would all have a similar look-alike NE for data forwarding, and a specific control element (which is outside the box) which makes it a router or a switch or whatsoever.

FIG. 4 illustrates the principles of SDN.

At the bottom of FIG. 4, a NE providing pure data forwarding functionality is shown. It comprises of the switching hardware (data path) which provides I/O ports, some pieces of software to allow configuration, a flow table which contains port based rules for data forwarding. Here will be a description of how to handle a packet depending on e.g. header information. For example, a rule may be that incoming packets on port 0 will be analyzed such that depending what information is in the header, the packet shall be forwarded to port 2 or 3. These rules, which are stored in a flow table, can be passed to the NE from a controller which resides out of the box (denoted as SDN control). For that, a protocol for exchange must be specified and both, the controller and the NE must be able to mutually understand the protocol (SDN client). A most prominent representative for an SDN control protocol is OpenFlow as specified in the Open Network Foundation ONF. Another known representative is Forces.

This way and with additional means a whole eco system for sharing transport equipment can be built up. NEs and controller can be cascaded and access can be limited. Introducing FlowVisors will limit access to certain parts of a Flow Table (e.g. ports 0 to 3). Controllers themselves may act as proxies to other controllers. Finally, SDN controllers may provide a northbound interface i/f to applications. By this, applications may acquire network resources via this interface in an abstracted way, e.g. "connectivity between topological point A and topological point B with a given bandwidth". SDN controllers may then instruct NEs out of a pool of NEs where as there might be several options to solve the request—still hiding the network HW to the application by using this abstract interface.

Current mobile network architectures are very complex in terms of transport layering and packet processing of the user payload. Depending of the generation of a mobile network, in an end-to-end connection, transport layers 1 (physical) to 3 or 4 (IP) are affected and require deep per-packet handling over various layers at certain topological points in the network like e.g. gateways. Such comprehensive packet processing not only requires high processing power, but also is difficult to be realized for wire speed, which requires that all packet manipulations are executed in hardware.

Furthermore, mobility management, especially handover between radio access points, add additional complexity as control protocols and anchor to anchor communication are necessary to re-adjust the encapsulation for forwarding And finally, in order to handle user-to-service and user to domain (e.g. enterprise) contexts, more and more tunneling layers have to be employed to ensure isolation, charging, QoS and security. This results in that—typically in an end-to-end user-to-service connection—various tunnels requiring various stateful interworking must be employed, e.g. a GTP tunnel (P-Gw—S-Gw—eNodeB), an IP tunnel (with an "outer" IP address), a VLAN tunnel and VPN tunnel (for security). This architecture makes it very difficult to do frequent changes in the network deployment since a variety of nodes requires complex (re-)configuration when adding/removing equipment.

Furthermore, during the course of mobile network evolution, more and more complex functions where added to specific nodes, like e.g. a P-GW or a GGSN, respectively, where control plane functions (C-plane) and data forwarding functions (U-plane) are closely mingled—which makes it more and more difficult to cope with ever increasing traffic, as the forwarding of each packets requires a high number of processing steps As a further drawback of today's architectures, there are two trends in IT and telecommunications that bring the existing architecture of RAN backhaul and core transport/core network to its limits:

1) Virtualization: there is a strong trend to de-compose core network functions and have them run as applications in data centers. This allows for HW independency and network elasticity. However, some of the core network nodes (e.g. gateways) show such a deep C-/U-Plane interworking that simple virtualization would mean that all traffic will hit the cloud. Here an architectural simplification of the end-to-end interconnection will be inevitable.

2) Localization in 5G: In the fore field of new emerging 5G architectures, it becomes obvious that much of the functionality that is currently done in the core network will be handled locally, in LAN based environments with a mix of WLAN access and pico/femto LTE base stations.

Here an architectural approach based on LAN technologies—most beneficially combined with mobile network principles—will be required.

SUMMARY OF THE INVENTION

It is therefore an object of the present invention to overcome the above mentioned problems and to provide apparatuses, methods, systems, computer programs, computer program products and computer-readable media regarding Ultra High-Speed Mobile Network based on Layer-2 Switching.

According to an aspect of the present invention there is provided a method comprising:

receiving, at a first gateway, a data packet from a first host served by the first gateway destined to a second host served by a second gateway, the data packet having a header comprising a layer 3 destination address of the second host and a broadcast layer 2 destination address, searching, by the first gateway, a flow table stored in the first gateway for an identity of the second gateway associated with the broadcast layer 2 destination address, if the identity is found in the flow table, replacing the broadcast layer 2 destination address with the identity of the second gateway serving the second host, and transmitting the data packet to the second gateway.

According to another aspect of the present invention there is provided a method comprising:

receiving, at a gateway, an attach request from a host, the attach request including a layer 3 destination address of the host, storing, at the gateway, the layer 3 destination address of the host in association with an identity of the gateway in an allocation table, and forwarding the layer 3 address of the host associated with the identity of the gateway to a register.

According to another aspect of the present invention there is provided a method comprising:

receiving, at a register, an inquiry from a first gateway for an identity of a second gateway corresponding to a layer 3 destination address, searching a database for the identity of the second gateway corresponding to the layer 3 destination address, and transmitting the identity of the second gateway corresponding to the layer 3 destination address to the first gateway.

According to another aspect of the present invention there is provided a method comprising:

receiving, at a register, information including a layer 3 address of a host associated with an identity of a gateway to which the host is attached, storing the layer 3 address of the host associated with the identity of the gateway in a database, and if the layer 3 address of the host is already stored in the database in association with another identity of another gateway, deleting the association with the another identity of the another gateway.

According to another aspect of the present invention there is provided an apparatus comprising:

at least one processor, and at least one memory for storing instructions to be executed by the processor, wherein the at least one memory and the instructions are configured to, with the at least one processor, cause the apparatus at least to perform:

receiving, at a first gateway, a data packet from a first host served by the first gateway destined to a second host served by a second gateway, the data packet having a header comprising a layer 3 destination address of the second host and a broadcast layer 2 destination address, searching, by the first gateway, a flow table stored in the first gateway for an identity of the second gateway associated with the broadcast layer 2 destination address, if the identity is found in the flow table, replacing the broadcast layer 2 destination address with the identity of the second gateway serving the second host, and transmitting the data packet to the second gateway.

According to another aspect of the present invention there is provided an apparatus comprising:

at least one processor, and at least one memory for storing instructions to be executed by the processor, wherein the at least one memory and the instructions are configured to, with the at least one processor, cause the apparatus at least to perform:

receiving, at a gateway, an attach request from a host, the attach request including a layer 3 destination address of the host, storing, at the gateway, the layer 3 destination address of the host in association with an identity of the gateway in an allocation table, and forwarding the layer 3 address of the host associated with the identity of the gateway to a register.

According to another aspect of the present invention there is provided an apparatus comprising:

at least one processor, and at least one memory for storing instructions to be executed by the processor, wherein the at least one memory and the instructions are configured to, with the at least one processor, cause the apparatus at least to perform:

receiving, at a register, an inquiry from a first gateway for an identity of a second gateway corresponding to a layer 3 destination address, searching a database for the identity of the second gateway corresponding to the layer 3 destination address, and transmitting the identity of the second gateway corresponding to the layer 3 destination address to the first gateway.

According to another aspect of the present invention there is provided an apparatus comprising:

at least one processor, and at least one memory for storing instructions to be executed by the processor, wherein the at least one memory and the instructions are configured to, with the at least one processor, cause the apparatus at least to perform:

receiving, at a register, information including a layer 3 address of a host associated with an identity of a gateway to which the host is attached, storing the layer 3 address of the host associated with the identity of the gateway in a database, and if the layer 3 address of the host is already stored in the database in association with another identity of another gateway, deleting the association with the another identity of the another gateway According to another aspect of the present invention there is provided an apparatus comprising:

means for receiving, at a first gateway, a data packet from a first host served by the first gateway destined to a second host served by a second gateway, the data packet having a header comprising a layer 3 destination address of the second host and a broadcast layer 2 destination address, means for searching, by the first gateway, a flow table stored in the first gateway for an identity of the second gateway associated with the broadcast layer 2 destination address, if the identity is found in the flow table, means for replacing the broadcast layer 2 destination address with the identity of the second gateway serving the second host, and Transmitting the data packet to the second gateway.

According to another aspect of the present invention there is provided an apparatus comprising:

means for receiving, at a gateway, an attach request from a host, the attach request including a layer 3 destination address of the host, means for storing, at the gateway, the layer 3 destination address of the host in association with an identity of the gateway in an allocation table, and means for forwarding the layer 3 address of the host associated with the identity of the gateway to a register.

According to another aspect of the present invention there is provided an apparatus comprising:

means for receiving, at a register, an inquiry from a first gateway for an identity of a second gateway corresponding to a layer 3 destination address, means for searching a database for the identity of the second gateway corresponding to the layer 3 destination address, and means for transmitting the identity of the second gateway corresponding to the layer 3 destination address to the first gateway.

According to another aspect of the present invention there is provided an apparatus comprising:

means for receiving, at a register, information including a layer 3 address of a host associated with an identity of a gateway to which the host is attached, means for storing the layer 3 address of the host associated with the identity of the gateway in a database, and if the layer 3 address of the host is already stored in the database in association with another identity of another gateway, means for deleting the association with the another identity of the another gateway.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

BRIEF DESCRIPTION OF THE DRAWINGS

These and other objects, features, details and advantages will become more fully apparent from the following detailed description of aspects/embodiments of the present invention which is to be taken in conjunction with the appended drawings, in which.

DETAILED DESCRIPTION

Figure 1:
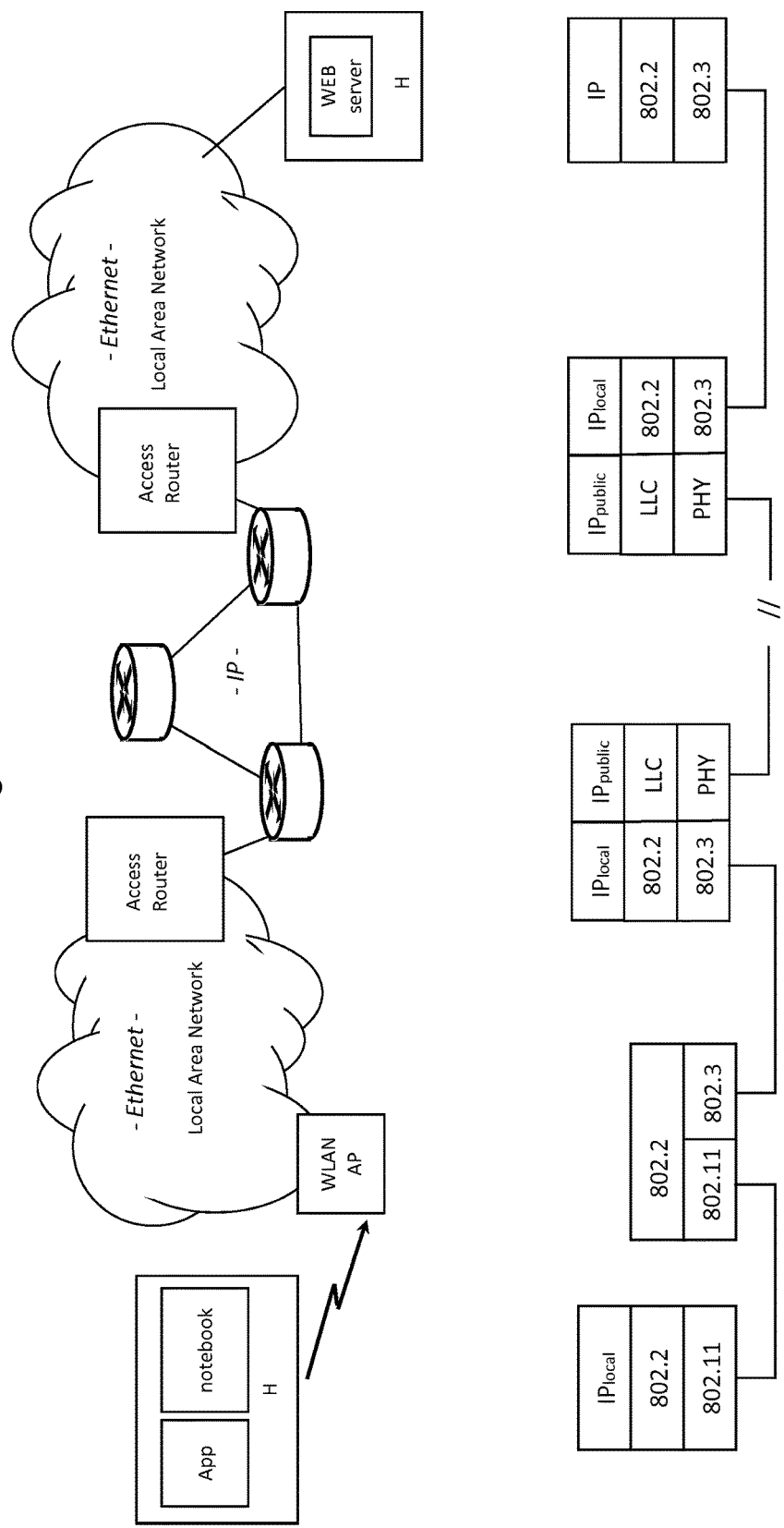
FIG. 1 is a diagram illustrating an example of an IT network.
Figure 2:
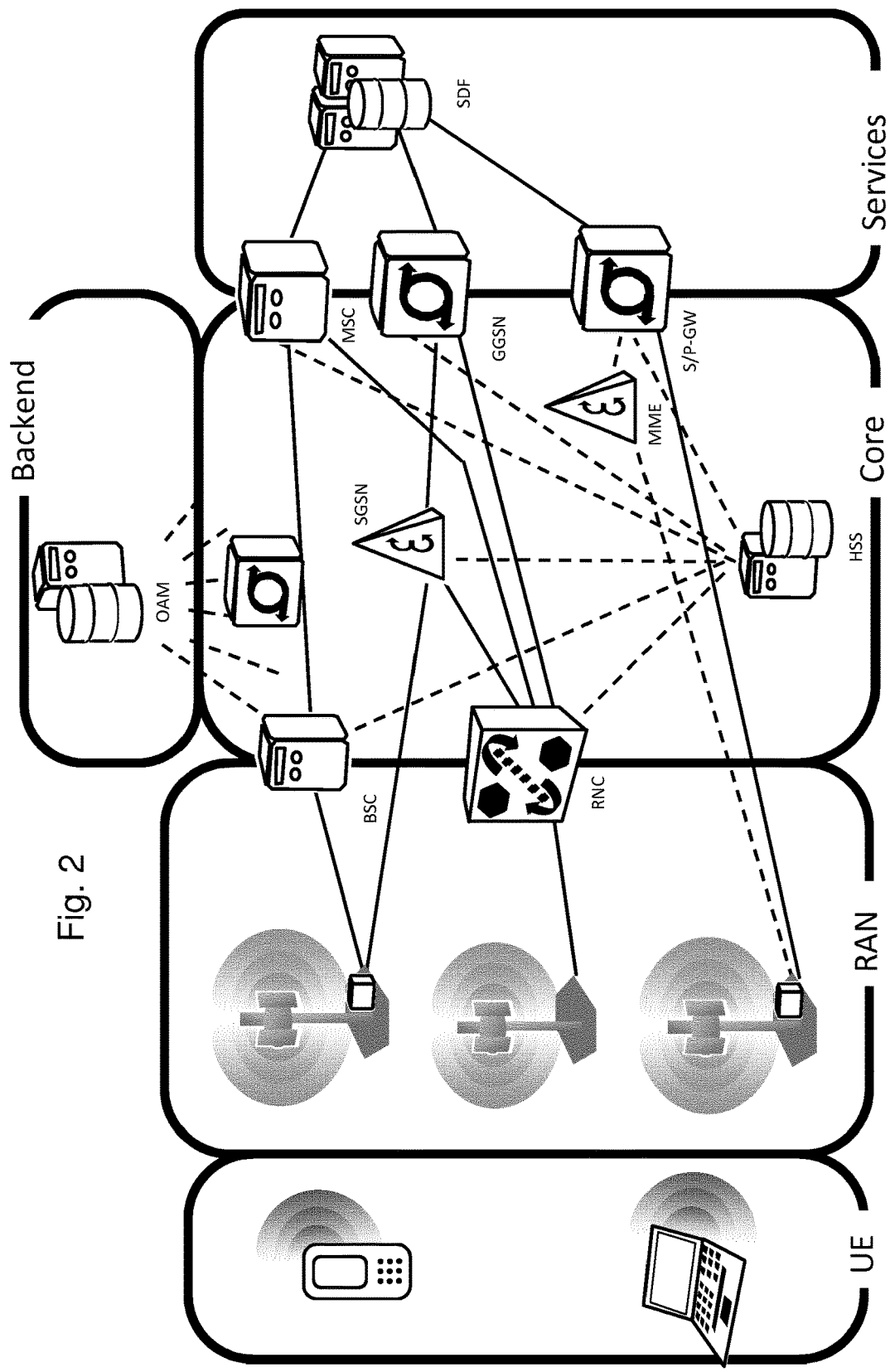
FIG. 2 is a diagram illustrating an example of a basic architecture of a mobile network.
Figure 3:
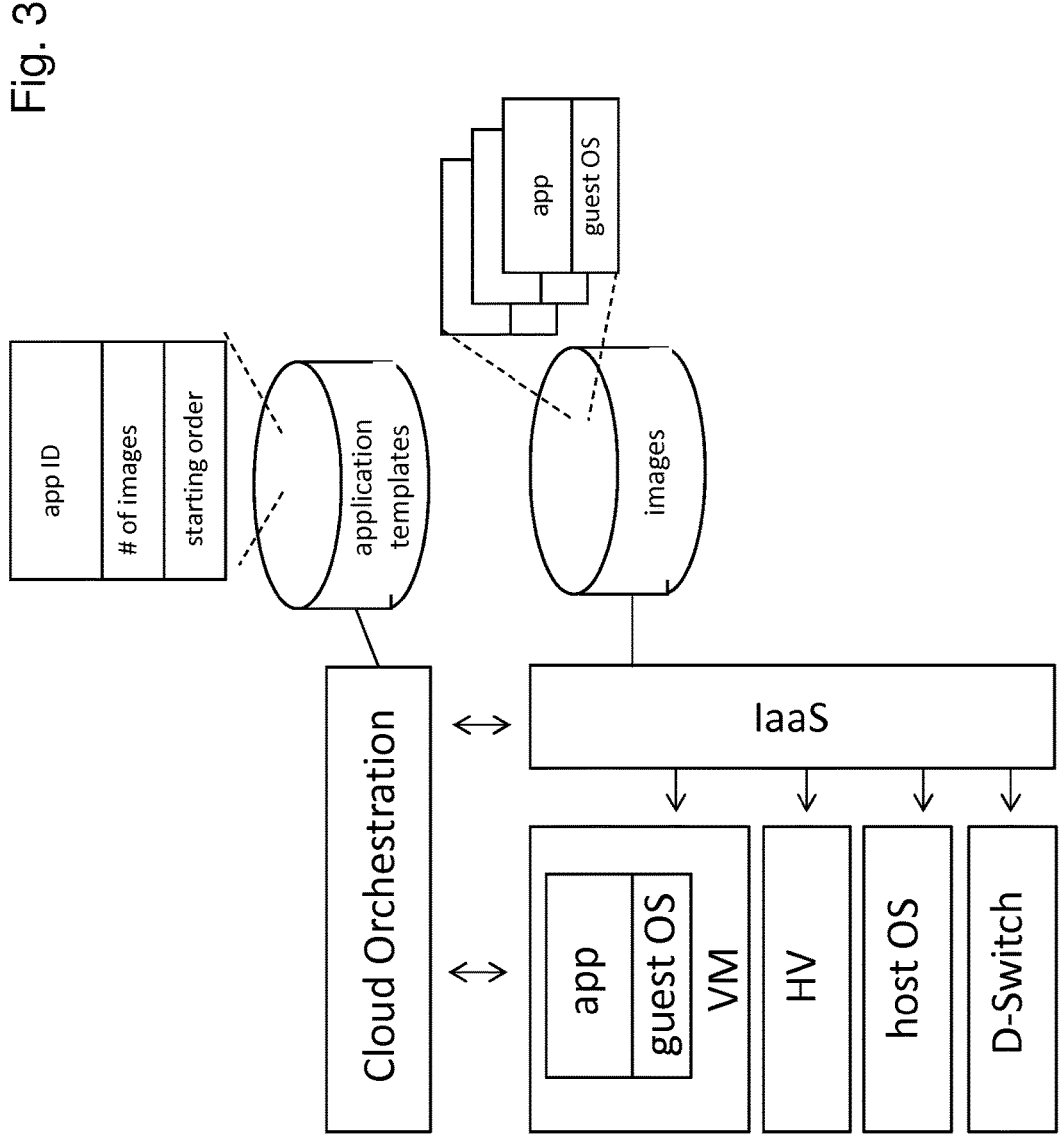
FIG. 3 is a diagram illustrating a typical setup of a data center and its management entities.
Figure 4:
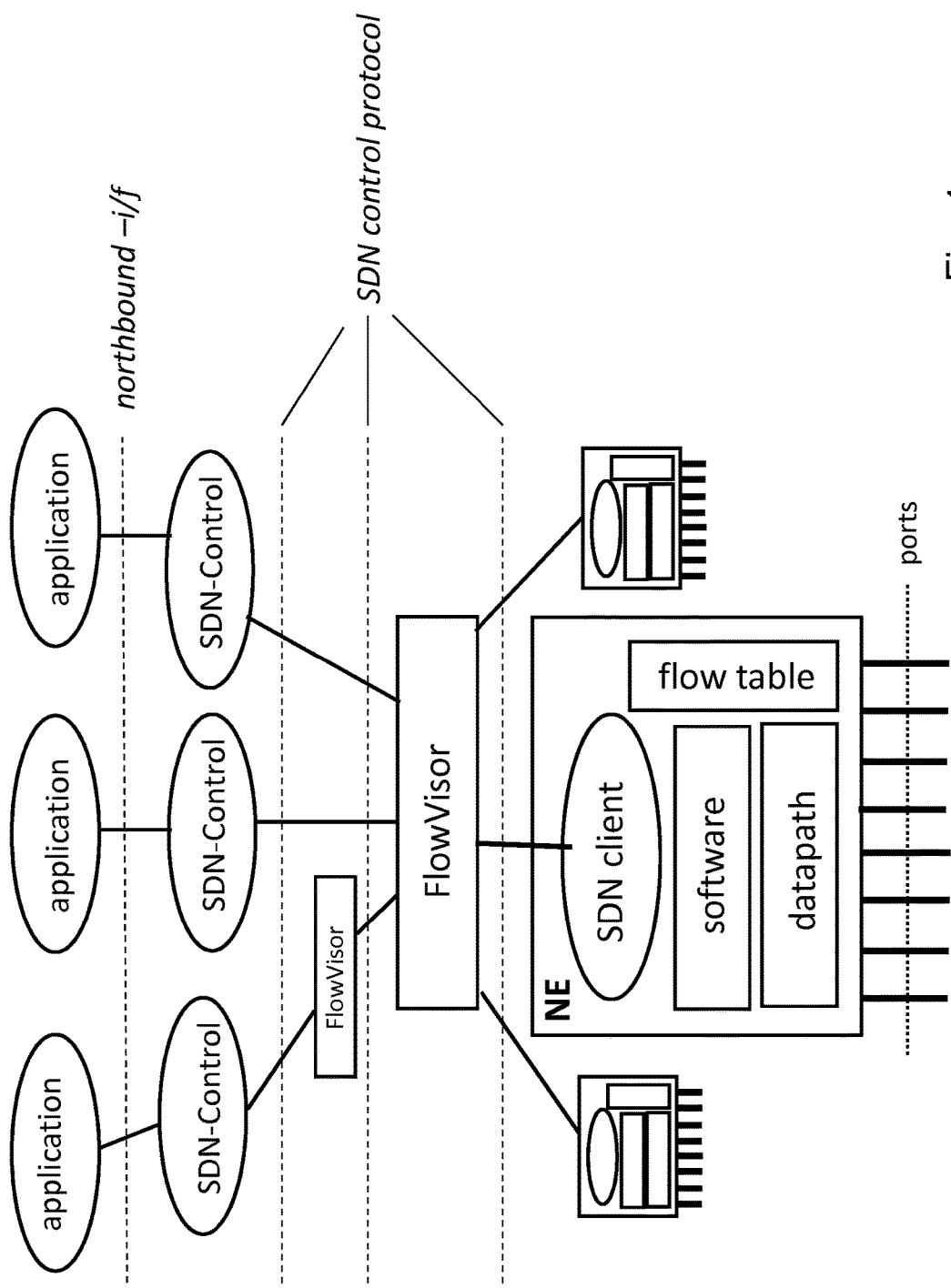
FIG. 4 is a diagram illustrating the principles of SDN.

In the following, some example versions of the disclosure and embodiments of the present invention are described with reference to the drawings. For illustrating the present invention, the examples and embodiments will be described in connection with a cellular communication network based on a 3GPP based communication system, for example an GSM, UMTS or LTE/LTE-A based system. However, it is to be noted that the present invention is not limited to an application using such type of communication system or communication network, but is also applicable in other types of communication systems or communication networks and the like.

The following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

The basic system architecture of a communication network where examples of embodiments of the invention are applicable may comprise a commonly known architecture of one or more communication systems comprising a wired or wireless access network subsystem and a core network. Such an architecture may comprise one or more communication network control elements, access network elements, radio access network elements, access service network gateways or base transceiver stations, such as a base station (BS), an access point or an eNB, which control a respective coverage area or cell and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a communication element or terminal device like a UE and a communication network control element like a radio network controller, besides those described in detail herein below.

The communication network is also able to communicate with other networks, such as a public switched telephone network or the Internet. The communication network may also be able to support the usage of cloud services. It should be appreciated that BSs and/or eNBs or their functionalities may be implemented by using any node, host, server or access node etc. entity suitable for such a usage.

Furthermore, the described network elements and communication devices, such as terminal devices or user devices like UEs, communication network control elements of a cell, like a BS or an eNB, access network elements like APs and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

According to example versions of the present invention, there is provided
 the architectural outline of a wide-area telecommunication system that allows end-to-end layer 2 (Ethernet) forwarding, and
 a description of additional key functions necessary to achieve this.

According to example versions of the present invention, the current host behavior when sending and receiving packets based on IP addresses over Ethernet does not change. However, by applying the principles of example versions of the present invention to today's fixed and mobile networks, the following can be achieved:
 the entire installed base for fixed/mobile transport can be reused;
 any Ethernet host can attach to the system and use services provided via this system;
 the end-to-end system provides inherent mechanisms for mobility management based on Ethernet; and
 specific fixed/mobile core functions such as gateways become optional According to example versions of the present invention, this is achieved by adding two components to the network, i.e. a client location register (CLR) and an access mediator (AM), which will be described later in detail, that provide the necessary functionality for wide area forwarding with Ethernet switching instead of IP routing. If SDN is used for managing transport connections, adding of additional specific hardware can be avoided completely.

The basic idea of this invention is to provide flat-layer 2 forwarding end-to-end, which does not require any tunneling of packets while still being able to handle mobile networks services and mobility management. The approach taken allows to add/remove network nodes without the need to manage interconnections on different layers. Furthermore, existing network nodes can be re-used and modifications (to achieve this flat network) are limited to a very few places in the network and if virtualization technologies are employed, no additional hardware will be required.

Figure 5:
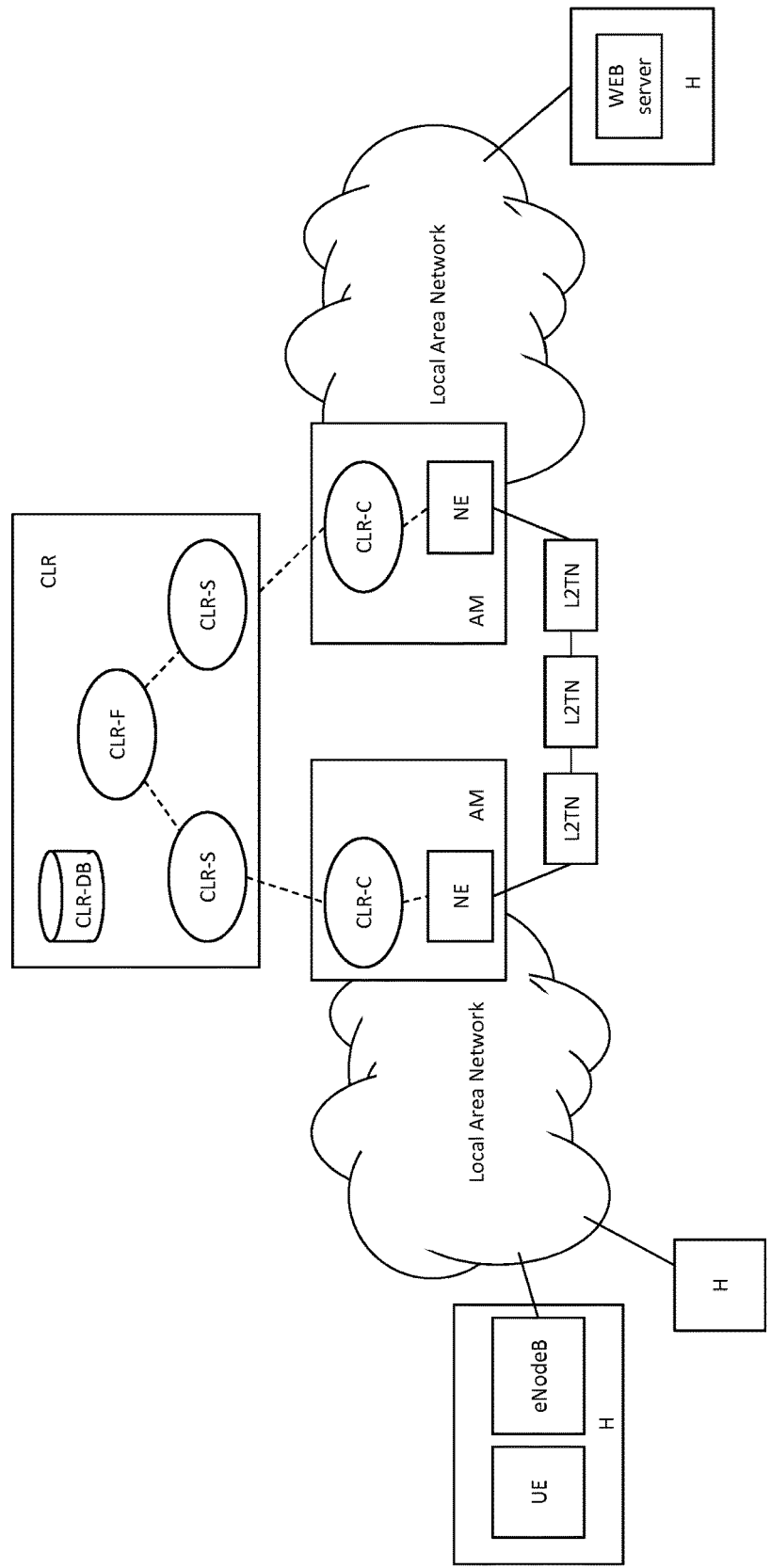
FIG. 5 is a diagram illustrating an example of a network architecture according to example versions of the present invention.

FIG. 5 is a diagram illustrating an example of a network architecture according to example versions of the present invention. Since all packet forwarding operations are based on layer 2 addresses, IEEE 802 terminology shall be applied. In an end-to-end layer 2 Ethernet architecture, hosts (H) are attached to local area networks communicating with peer hosts that are connected to peer local area networks. Typically, one peer host may comprise of a web server while typically a user host may be represented by a notebook or computer that is either wire-line connected (Ethernet) or wirelessly connected (via WLAN, or WiFi, respectively). There may be a variety of (embedded) nodes on the user side, comprising of UE or the UE+eNodeB appearing as a host. Since the connectivity of a 4G UE to an eNodeB is handled by means of 4G radio access (and those mechanisms shall remain untouched), the generic term "host" H shall be used further on.

Hosts and peering hosts (user accessing a web service) are using well known IP protocol functions to determine the L3 identities (IP addresses) and assemble IP packets. These mechanisms shall also remain untouched in this proposal.

Typically, within a local area network, layer 2 addresses (MAC addresses) are used for distinguishing data packet paths, however, in large deployments (world wide networks) those local area networks are interconnected employing layer 3 (IP) networks (router).

Local area networks (Ethernet) are connected to wide area networks (IP) via a specific gateway node (denoted in this description as AM (access mediator)) in FIG. 5. Typically, in case of IP networks, local area networks use a local IP address scheme with an IP address and a network mask for intra and inter local area network communication, allowing the hosts to distinguish whether or not a peering host is in the same local area network or outside—which will lead to a different behavior when setting up a connection to a peer host.

One major difference of the proposed new solution to existing ones is that IP addresses are treated directly accessible in the whole system—there is no need to assign a new local IP addresses when a host moves from one local area network to another, as the once assigned IP address can be used throughout the whole network. In order to support existing address assignment procedures without modification, a network mask indicating a completely 'local' network shall be assigned together with the IP address. Thus all hosts connected to any of the multitude of local area networks consider the complete global network to be a 'local' (flat) network: this means, it appears as one "big" local area network, with all hosts reachable on their Link Local addresses (in case of IPv6)—although it may comprise of many (interconnected) LANs.

Since all hosts consider the whole global network being a flat local area network, all mechanisms of a flat layer 2 Ethernet networks apply for global connectivity.

It has particular benefits when the host moves across the coverage area of the network and connects to the network at different locations:
 wherever a host attaches to, the IP address remains valid, i.e. running applications are not affected;
 wherever a host attaches to, connectivity is granted on layer 2, i.e. the host can communicate with any other node attached to the global network and it can be reached by any of those.

To represent the global network as a flat layer 2 network, mediation of packets destined for other LANs of the global network needs to take place for delivery of the packets across multiple LANs. Most beneficially, this mediation is aimed to take place at an access gateway—or access mediator AM as shown in FIG. 5. Each local area network shall be interconnected to peering LANs by a mesh of layer 2 switches, or layer-2 data forwarding nodes. In this context Layer 2 data forwarding nodes are considered as equipment that is able do port-based packet forwarding by analyzing the layer 2 header information and by applying rules that are stored e.g. in a forwarding table configured by SDN, or OpenFlow. Each local area network is connected to the global network via an access mediator AM.

Another key characteristic of the proposed solution is the implementation of a Client Location Register (CLR) in which pairs of host-IP addresses and Access Mediator MAC addresses are stored. The functionality of AM and CLR are described in detail further below.

Since all hosts see the whole network as a single shared link ("Global LAN"), the hosts maintain their once assigned IP addresses, instead of being reassigned (local) IP addresses via DHCP (Dynamic Host Configuration Protocol). Whenever a host attaches to a local network that is served by an AM, the hosts will issue an ARP message (gratuitous ARP, address resolution protocol) containing their MAC address and their assigned IP address. Upon reception of this message, the CLR-C function will look up the allocation table and verify whether or not an existing entry with this IP address exists. If not, the CLR-C function will communicate with the CLR-S function in the CLR and report this new IP address together with its own MAC address to the CLR (which will store this context, as described later).

This way, the CLR receives information about all host IP addresses of the entire network and can set them into context with the MAC address of the corresponding AM those are connected to.

The access mediator AM is replacing the access router of a traditional LAN. Note that the local area network itself and all its attached hosts remain untouched with respect to functionality.

Figure 6:
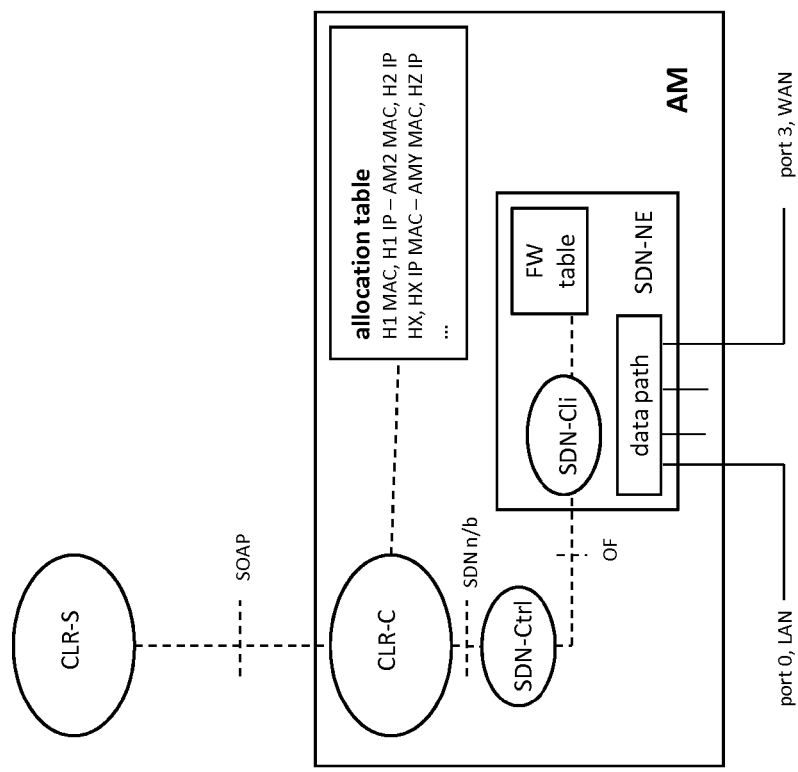
FIG. 6 is a diagram illustrating an example of the principle design of an access mediator according to example versions of the present invention.

FIG. 6 is a diagram illustrating an example of the principle design of an access mediator according to example versions of the present invention. Most beneficially, all functions related to data forwarding are separated from the control entities. This allows for a setup with the control entities running in a data center and only the forwarding elements would stay local at the LAN. The forwarding entity (box at the middle bottom in FIG. 6) comprises of typical forwarding functions of a SDN forwarding node, e.g. a data path, a Flow Table FW and control functions potentially comprising an SDN control client (SDN-Cli) that allow manipulations of the flow table, i.e. to establish rules for packet data forwarding/modifications based on header information.

By this, an SDN Controller SDN-Ctrl may apply rules to the forwarding engine, e.g. change source and destination MAC addresses of packet headers and forward them to given ports. For this type of controller information exchange, typical SDN protocols such as OpenFlow may be used. This SDN controller may again communicate via an SDN northbound interface SDN n/b to an AM controller, which acts as a client communication controller CLR-C towards a client location register CLR. Besides this communication to the peering CLR server client in the CLR, this controller can setup, maintain and interrogate an allocation table, in which (local) host MAC addresses and (local) host IP addresses are stored and put into context with corresponding (peer) host MAC addresses and the (peer) AM MAC address those (peer) hosts are connected to.

Figure 7:
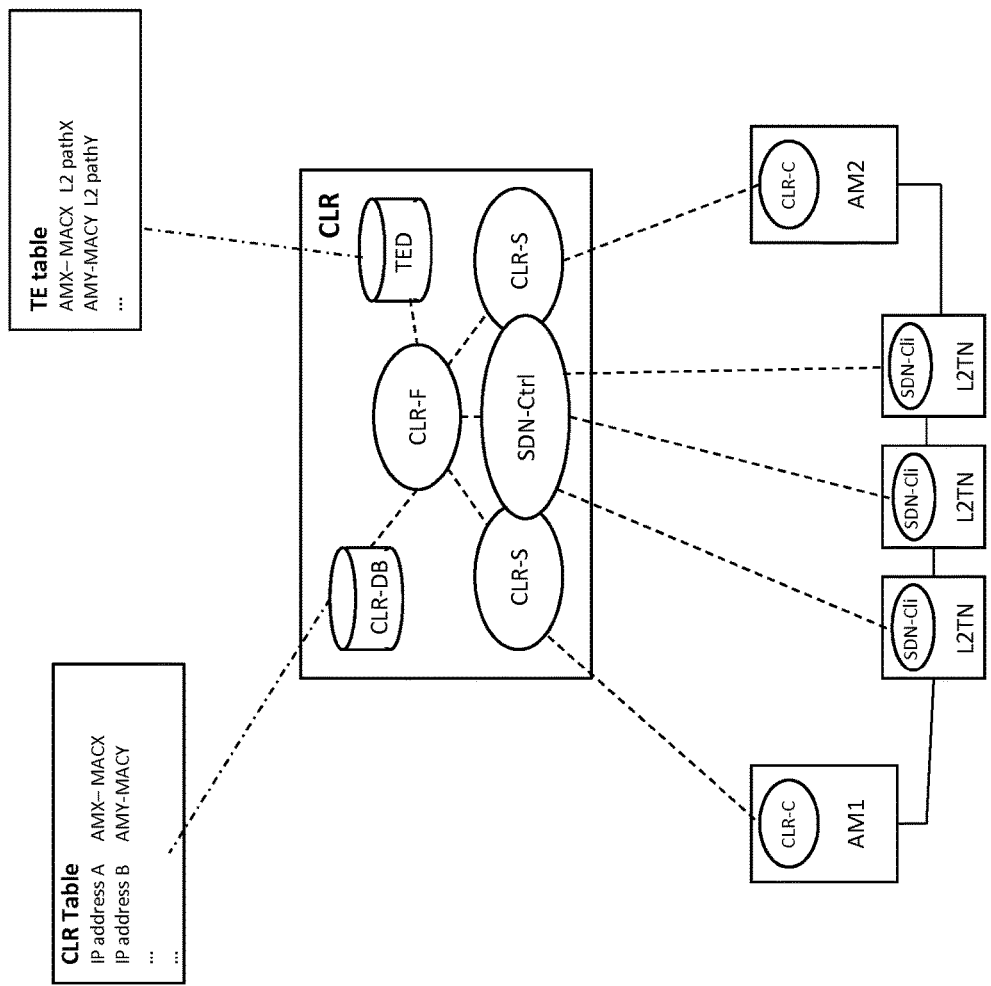
FIG. 7 is a diagram illustrating an example of a principle setup of a client location register according to example versions of the present invention.

FIG. 7 shows the principal setup of a client location register. Alongside with CLR-S functions required to communicate with the corresponding CLR-C functions of the attached AM, it may—optionally—comprise of an SDN controller. This can most beneficially be employed when the interconnection of the various local area networks is based on SDN capable layer 2 switches. In addition, the CLR comprises of its main CLR function CLR-F. This function steers the different communication between the CLR-S and the SDN controller. In addition, it has access to a CLR database CLR DB in which the context between host IP addresses/AM MAC addresses (that are continuously reported by the AMs) are stored, updated and looked up.

Finally, the CLR may have access to a traffic engineering database TED to derive path information between two AMs (e.g. a local and a peer one) and use this information to configure SDN based layer 2 switches that are on the path between two AMs.

Figure 8:
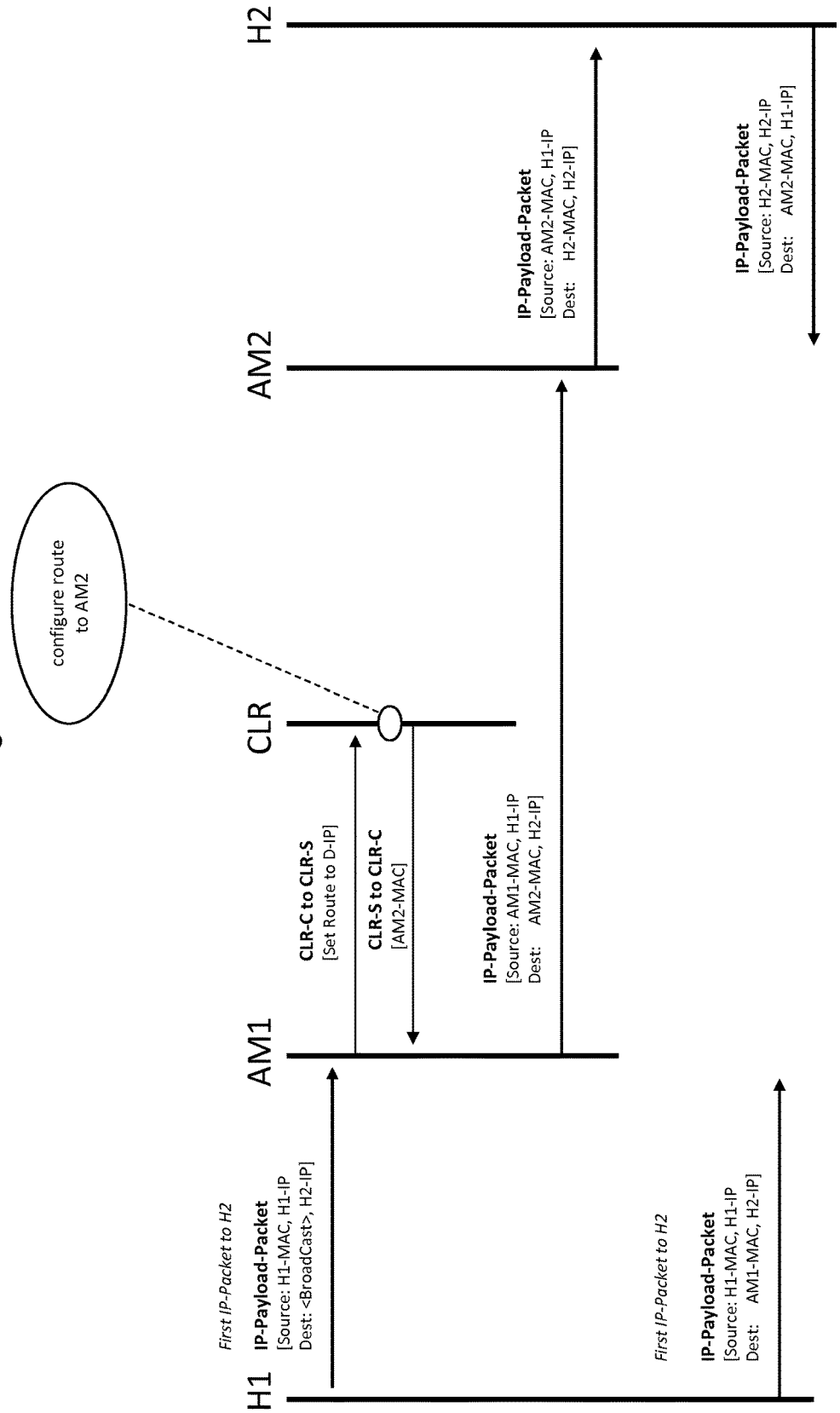
FIG. 8 is a diagram illustrating an example of a message flow for a packet delivery between a local host and a peer host according to example versions of the present invention.

FIG. 8 describes the message flow of an implementation example for a first packet delivery between a local host (H1, e.g. a user) and a peer host (H2, e.g. a Web Server). The local host H1 knows the IP address of the peer host H2 (typically it was returned as a result of a DNS (domain name system) enquiry for a URL (uniform resource locator)). However, it does not have knowledge about the H2 MAC address. Since H1 "sees" the whole network as a flat layer 2 network, H1 "assumes" H2 to be located in the same local area network. As typical procedure for this type of host-host communication—peer host IP address known, peer host MAC address unknown, peer host IP belonging to the same local area network (matches the network mask)—H1 will send out its Ethernet frame comprising of the first IP payload packet and a header field with the following content: H1 (source) IP address, H1 (source) MAC address, H2 (destination) IP address and a broadcast MAC address (since H2 MAC address is unknown.

Since H2 in this example is located outside the local area network, H2 cannot respond directly. Instead, AM1 will detect that H2 is not attached to the local area network H1 is attached to (and of which AM1 is the gateway) simply by looking up the allocation table and by finding no matching entry. In this case AM1 will interrogate CLR by using the CLR-C/CLR-S interface which, in a simple implementation, could be RESTful (REST: Representational state transfer) (http based). CLR will find an appropriate pair in its CLR-DB where H2's IP address is associated with an according AM2 MAC address, whereas AM2 is the access mediator serving the local area network H2 is attached to. This information is passed to AM1 which will in return update its allocation table.

At this point in time, layer 2 connectivity between AM1 and AM2 can be established by means of SDN, if not already pre-configured.

In real world deployments, often local area networks are interconnected using VLAN tunneling mechanisms or MPLS labeling for separating different LAN/LAN connections. As a difference to individual host/host connections, LAN/LAN connections are long haul aggregated connections. Most typically, it can be assumed that AMs should already have (pre-)configured those LAN/LAN connections which make up the mentioned global network. In this case, AM1 could reach AM2 via e.g. a VLAN tunnel. However, in order to keep the given conceptual approach as generic as possible, it shall be assumed that the connection between AM1 and any possible peering AM (AM2 in example) may not be configured at this point in time, at least not on layer 2. In order to flexibly provide the necessary layer 2 connection between AM1 and AM2, this shall be provided by means of SDN—steered by the SDN controller of the CLR. Assuming this controller has access to a traffic engineering database TED, which allows computing the most suitable path information between AM1 and AM2. Most typically, the TED is part of a PCE (path computation element). The SDN controller would then act as a PCC (path computation client) and request appropriate path information between the two AMs and receive appropriate information (layer 2 hops, or L2TN links as shown e.g. in FIG. 10).

With this information, CLR's SDN controller may manipulate the flow tables of all affected L2TN appropriately (e.g. by assigning specific port forwarding rules based on peer AM MAC addresses). Most beneficially, if SDN is used for path configuration, AM1 and AM2 are to be considered as the peer SDN forwarding nodes in this chain and thus part of this configuration process, i.e., the CLR SDN-Ctrl may also access and manipulate AM forwarding tables.

Upon reception of the matching AM2-MAC address and after the layer 2 interconnect between both AMs has been configured, AM1 may now send out the payload packet towards AM2 (e.g. on an appropriate port that was assigned by the SDN controller). Before, it has replaced the destination MAC address (which was a broadcast address before) by AM2's MAC address and by also replacing the MAC source address (which was H1's MAC address before) by its own AM1 MAC address.

Upon reception of the packet, AM2 will find H2's MAC address by a look up of its allocation table. In return, it will update the allocation table with respect to H1's IP address/ AM1's MAC address for further packet delivery in the return direction (H2 to H1). AM2 to will set the according header fields, set its own AM2 MAC address as source MAC address and replace the destination MAC address with H2's MAC address (AM2 MAC address before).

Packets in the reverse direction can now be sent with all allocation information being available in the AMs so that those can do the address field mediations without further interrogation of the CLR.

Figure 9:
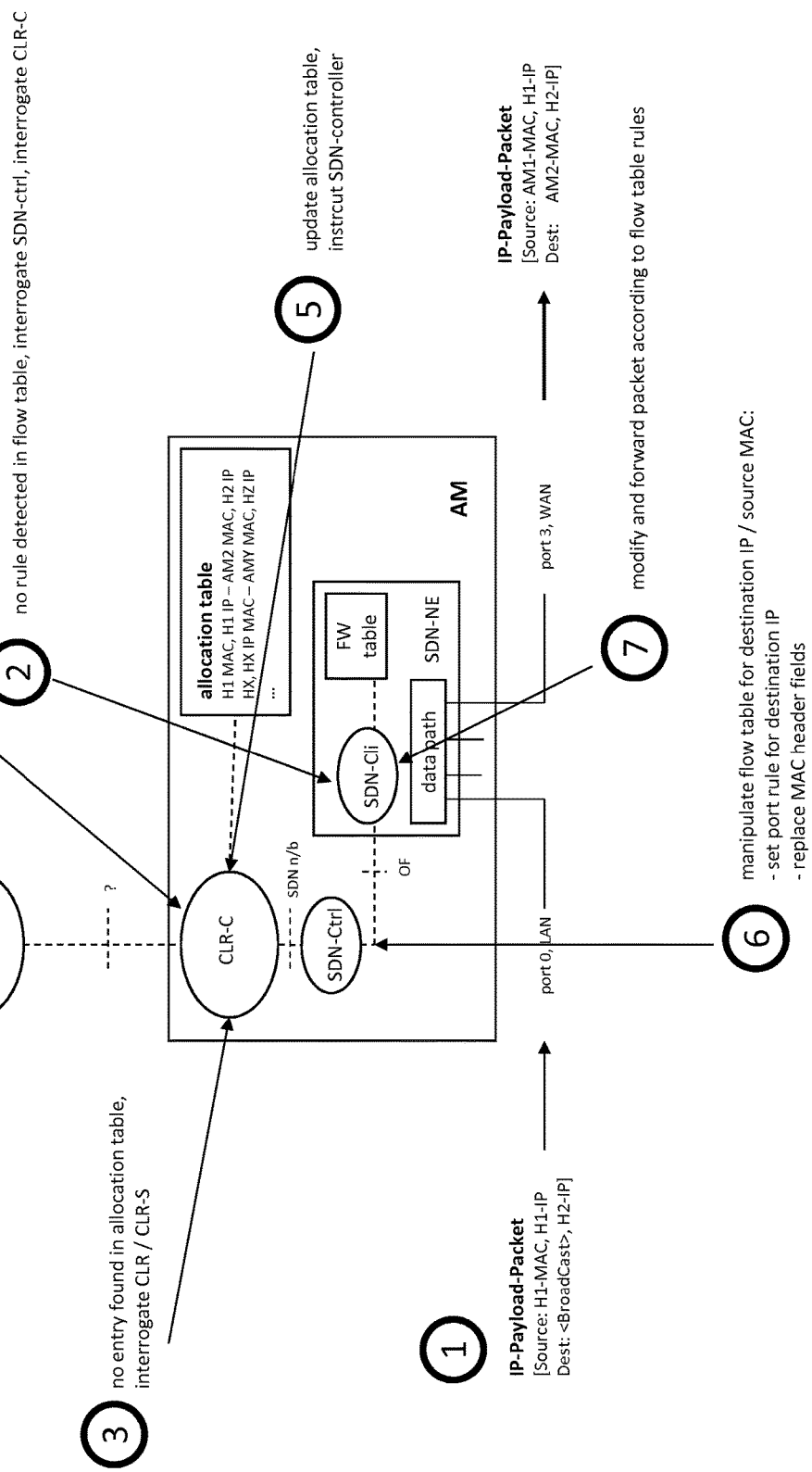
FIG. 9 is a diagram illustrating an example of an implementation of an access mediator and corresponding steps for sending payload according to example versions of the present invention.

FIG. 9 shows a possible implementation of the AM and the according steps for a payload packet being sent.

Step (1): upon reception of a data packet, most beneficially via an Ethernet port of an SDN enabled network element (port 0 in figure), the SDN-Cli will look up for a matching entry in the flow table.

Step (2): if no matching rule or entry is found (because it's the first packet towards the peer host), the SDN-Cli will enquire CLR-C.

Step (3): CLR-C will interrogate the allocation table for a matching AM MAC address for the destination IP address found in the packet header. If no match is found (again, because it's the first packet towards the peer host), the CLR-C will contact CLR-S in the CLR.

Step (4): The CLR-S will look up the matching target AM address and provide it to the requesting AM. In addition, it may obtain path information to connect the requesting AM to the target AM and configure the SDN chain (see FIG. 8). It will send the matching target AM MAC address together with [optional] SDN configuration information (e.g. target AM can be reached through port 3, see FIG. 9) to the CLR-C.

Step (5): Upon reception of this information, CLR-C will update its allocation table (target IP address is associated with target AM MAC address).

Step (6): CLR-C will instruct the SDN-Ctrl to place a rule that the destination MAC address in all header with the given target IP address shall be swapped with the according target AM MAC address (see above description to FIG. 8). In addition, CLR-C will instruct the SDN-ctrl inside the AM to configure the flow table such that all packets having target AM MAC address in the header field will be forwarded to a specific port (port 3 in FIG. 9).

Step (7): now that the forwarding rules are in place, the packet can be modified and forwarded as described above— as all packets to come with the given destination IP address will.

Figure 10:
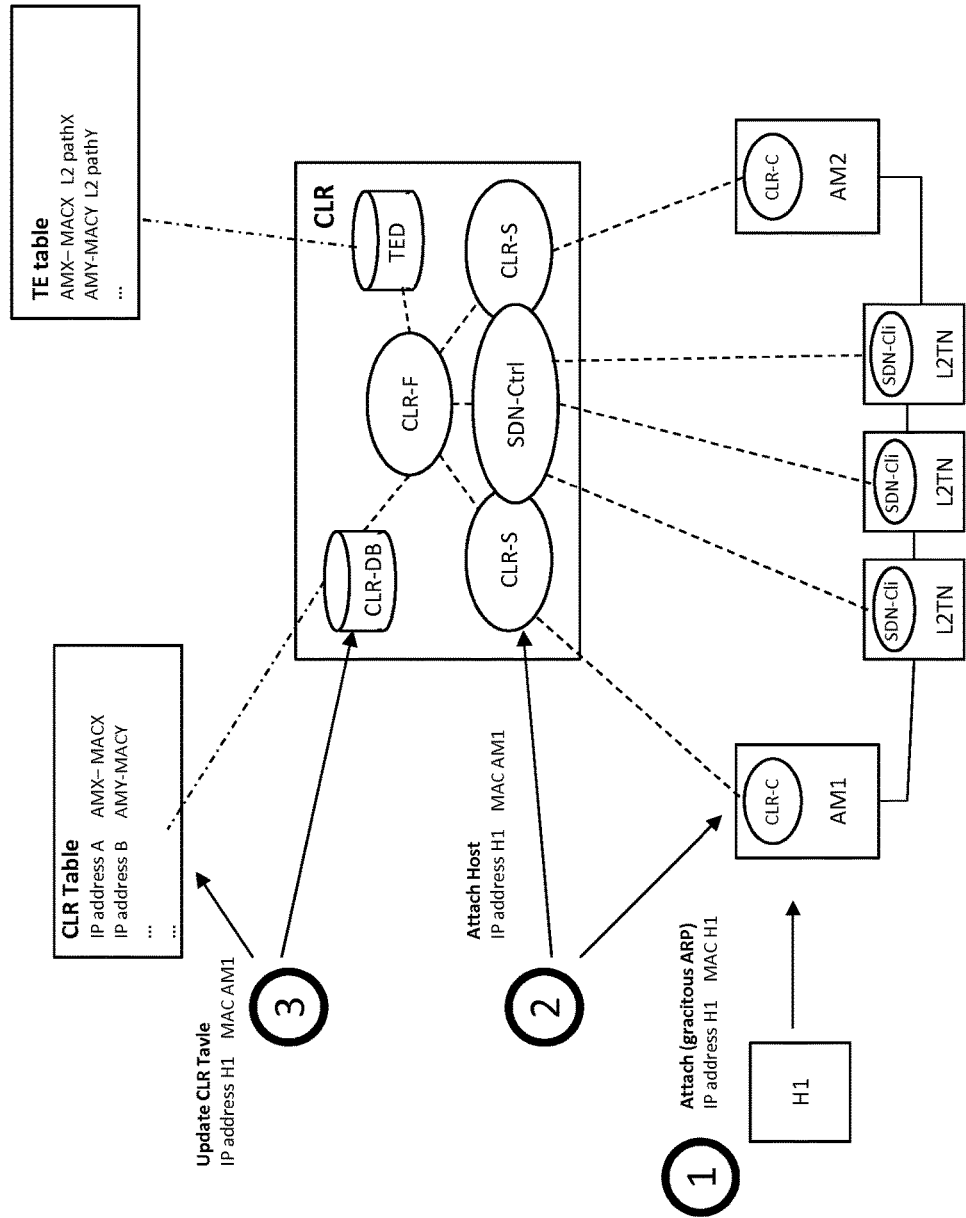
FIG. 10 is a diagram illustrating an example of an implementation of the communication network and corresponding steps for an attach of a host according to example versions of the present invention.

FIG. 10 shows an implementation example for the whole system of and the according steps for an initial attach of a host, i.e. a host attaches to a new local area network.

It is assumed that a host already has an assigned IP address but it enters the local area network for the first time or he has previously been to another local area network and re-enters to a given LAN.

Step (1): Since the whole network is "seen" as a flat one, the host will not inquire for a new IP address. Rather it will issue an "gracious ARP", an ARP request that will not lead to any assignment of identities to the host, in this quasi flat network it is simply perceived as "hello, I'm here" sort of message allowing the network to update according tracking databases.

Step (2): Upon receipt of this message, the AM will update its allocation table, i.e. the host IP address is associated with its host MAC address and it will send according information to the CLR.

Step (3): The CLR will use this information to update its CLR table: in case the reported IP address is already assigned with another AM's MAC address, this context will be deleted and the reported AM's MAC address will be assigned with the reported IP address. In this case the CLR shall report back a detach information (not shown in figure) to the AM to which the host was connected to before, that allows this AM to update its own lookup tables. This way the CLR's table will be populated with host IP address/AM MAC address entries which will be updated whenever these contexts change, i.e. when hosts attach to different local area networks.

Figure 11:
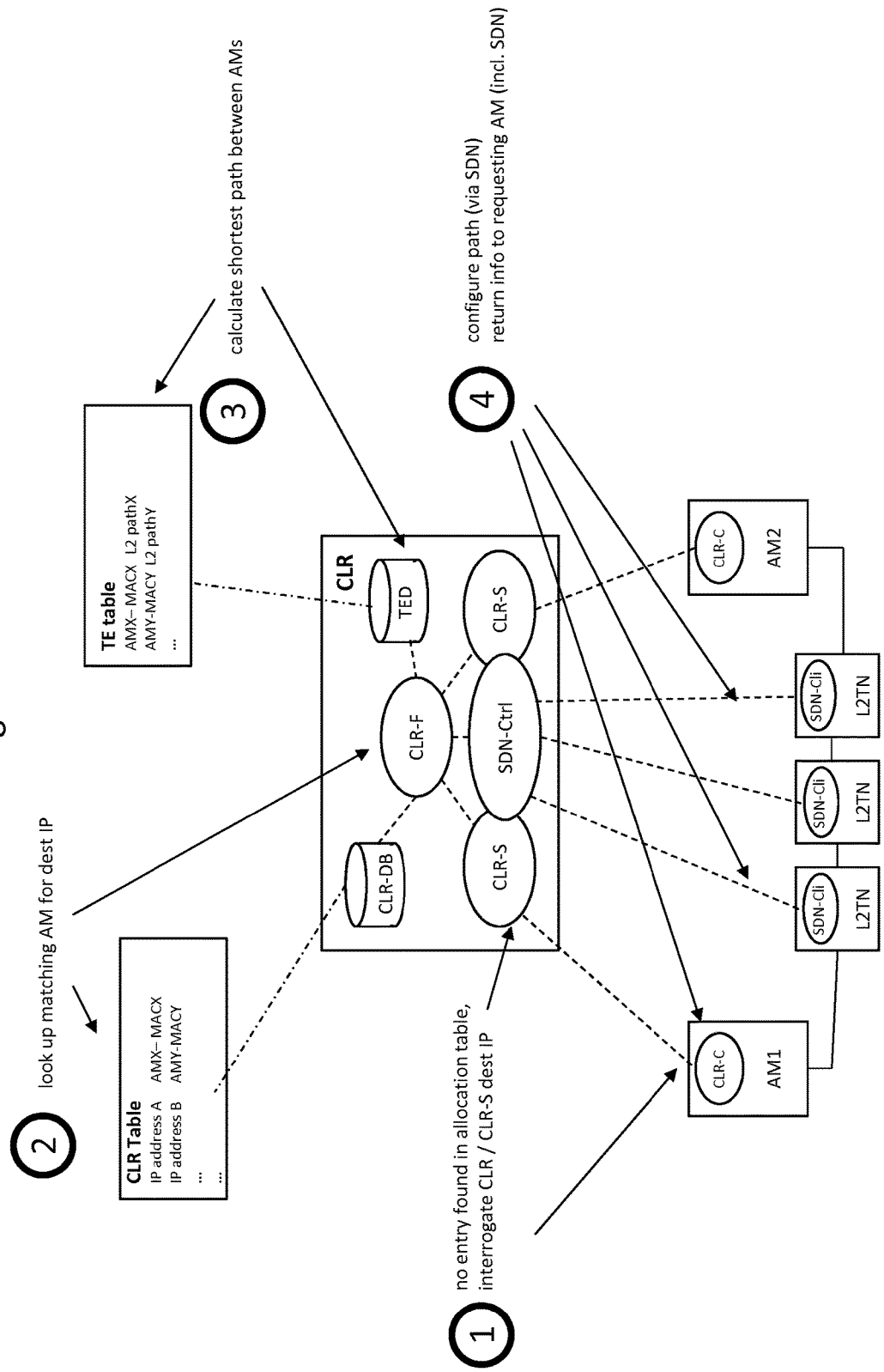
FIG. 11 is a diagram illustrating an example of an implementation of a client location register and corresponding steps for sending payload according to example versions of the present invention.

FIG. 11 shows a possible implementation of the CLR and the according steps for a payload packet being sent.

Step (1): Ever when a AM cannot associate a destination IP address with a destination AM MAC address, either because there is no forwarding rule found in the flow table or because there is no association context existing (i.e. it's the first time a packet is sent to this destination host IP address) it will interrogate the CLR.

Step (2): The CLR will look up in its database for matching IP address/AM MAC address entries and report back to the interrogating AM.

Step (3)+(4): Optionally, the CLR may retrieve path information from its TED (TE-table in FIG. 11) and configure the shortest weighted path between source AM and destination AM and pass according information also down to both AMs.

Figure 12:
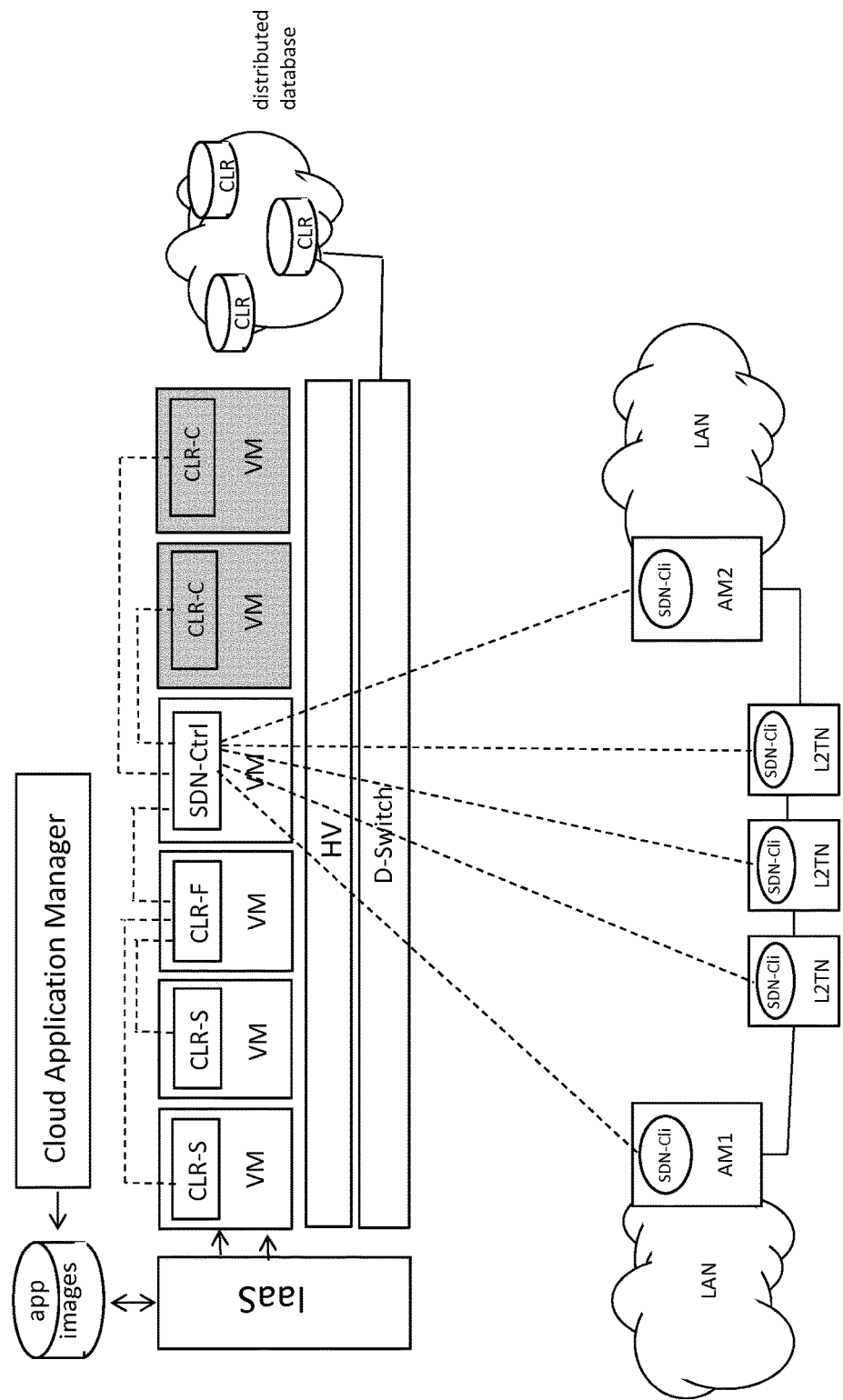
FIG. 12 is a diagram illustrating an example of an implementation approach with a fully virtualized client location register and access mediator and SDN enabled switches according to example versions of the present invention.

FIG. 12 shows an implementation approach with a fully virtualized CLR and AM and with SDN enabled switches for interconnect. This approach may be the most advantageous since it requires no new or specific hardware to be placed in the field, all control functions can be realized in data centers. Furthermore, depending on traffic or signaling load, different instances of functions of CLR and AM may be setup and this allows fully independent scaling of all functions involved.

The AM is split into a hardware part, which comprises of a typical SDN NE. This way, any SDN NE, or any SDN enabled layer 2 switch, respectively, may turn into an AM—which allows for maximum flexibility and elasticity also in the transport (U-) plane.

Application images of CLR- and AM-functions are stored in app data base, which is accessible for a cloud application manager and a cloud management system (IaaS infrastructure as a Service in FIG. 12). The cloud application manager has knowledge about how much applications make up a function, to which other entities this application needs to be connected to and the key performance requirements.

The IaaS is able to invoke applications on virtual machines VM. A virtual machine may comprise of a number of CPU and storage. Typically, a data center middleware, HyperVisor HV allows running those virtual machines on data center hardware platforms providing connectivity between applications inside and outside the data center via the data center switching fabrique.

In FIG. 12 there is one instance for an AM CLR-C running on a VM (gray color) in one-to-one redundancy mode. Additionally, there are instances of CLR-S (two), CLR-F and an SDN Controller. Most of the signaling between the applications stays inside the data center (dotted lines above VMs), the signaling to outside entities is reduced to an SDN control interface (Open Flow).

Most beneficially, CLR data is stored in a distributed redundant data base.

This setup allows the transport plane to be fully flexible in terms of functionality: layer 2 switches may be used for layer 2 transport (L2TN) or as AM—or both.

In the following, a more general description of certain embodiments of the present invention is made with respect to FIGS. 13 to 17.

Figure 13:
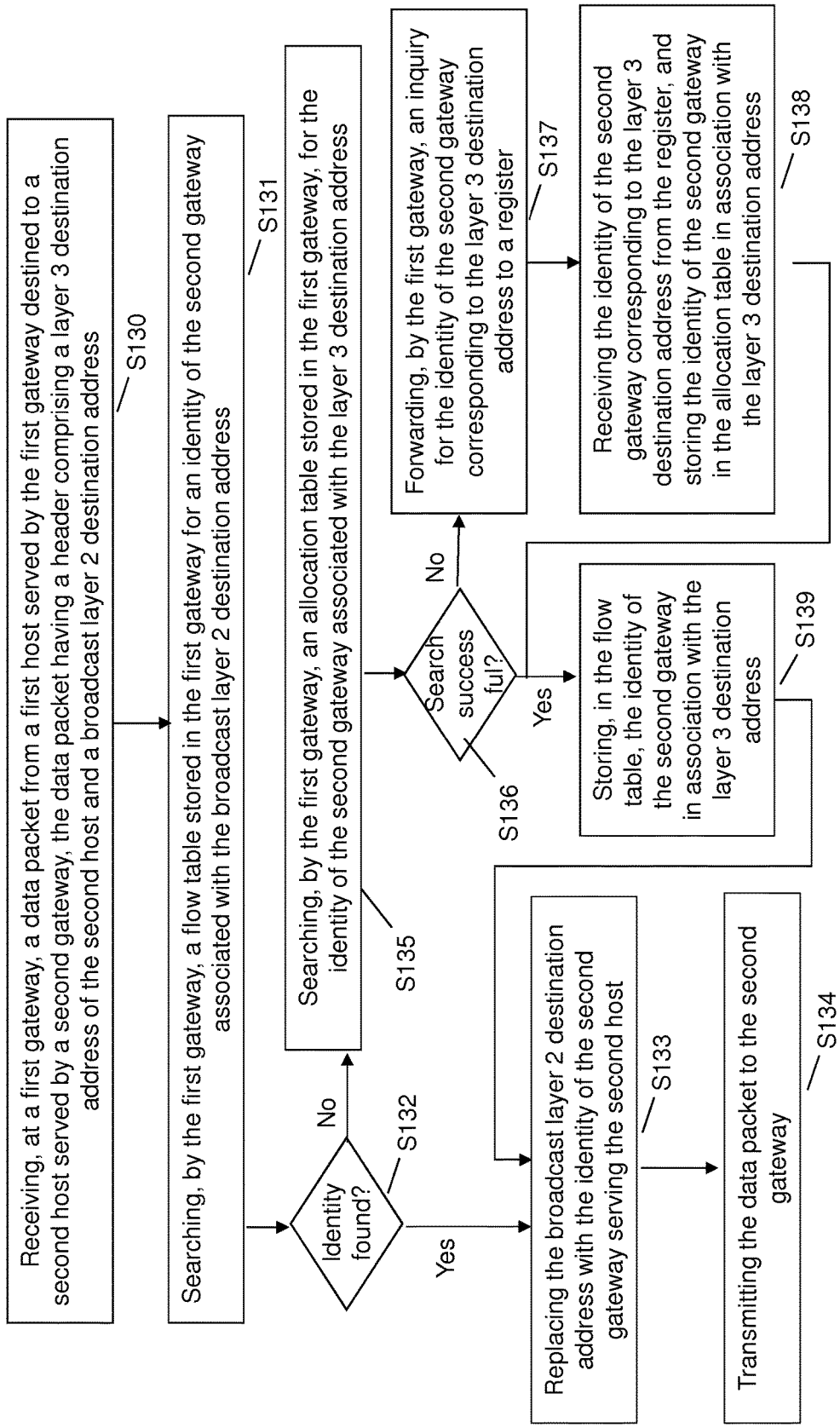
FIG. 13 is a flowchart illustrating an example of a method according to example versions of the present invention.

FIG. 13 is a flowchart illustrating an example of a method according to example versions of the present invention.

According to example versions of the present invention, the method may be implemented in a gateway, or the like. The method comprises Receiving, at a first gateway, in a step S130, a data packet from a first host served by the first gateway destined to a second host served by a second gateway, the data packet having a header comprising a layer 3 destination address of the second host and a broadcast layer 2 destination address, and searching, by the first gateway, in a step S131, a flow table stored in the first gateway for an identity of the second gateway associated with the broadcast layer 2 destination address. If it is determined in step S132 that the identity is found in the flow table (Yes at step S132), the broadcast layer 2 destination address is replaced with the identity of the second gateway serving the second host in step S133, and then, in step S134, the data packet is transmitted to the second gateway.

According to further example version of the present invention, if it is determined in step S132 that the identity is not found in the flow table (No in step S132), the method further comprises searching, by the first gateway, in a step S135, an allocation table stored in the first gateway, for the identity of the second gateway associated with the layer 3 destination address. If it is determined in step S136, that the search was successful (Yes in step S136), i.e. if the identity of the second gateway associated with the layer 3 destination address is found in the allocation table, the identity of the second gateway is stored in the flow table in association with the layer 3 destination address in a step S139. Then, the processing proceeds further to step S133.

According to further example versions of the present invention, if it is determined in step S136 that the search is not successful (No in step S136), i.e. if the identity of the second gateway associated with the layer 3 destination address is not found in the table, the method further comprises forwarding, by the first gateway, in a step S137, an inquiry for the identity of the second gateway corresponding to the layer 3 destination address to a register, receiving the identity of the second gateway corresponding to the layer 3 destination address from the register, and storing the identity of the second gateway in the allocation table in association with the layer 3 destination address in a step S138. Then, the processing proceeds further to step S139.

Figure 14:
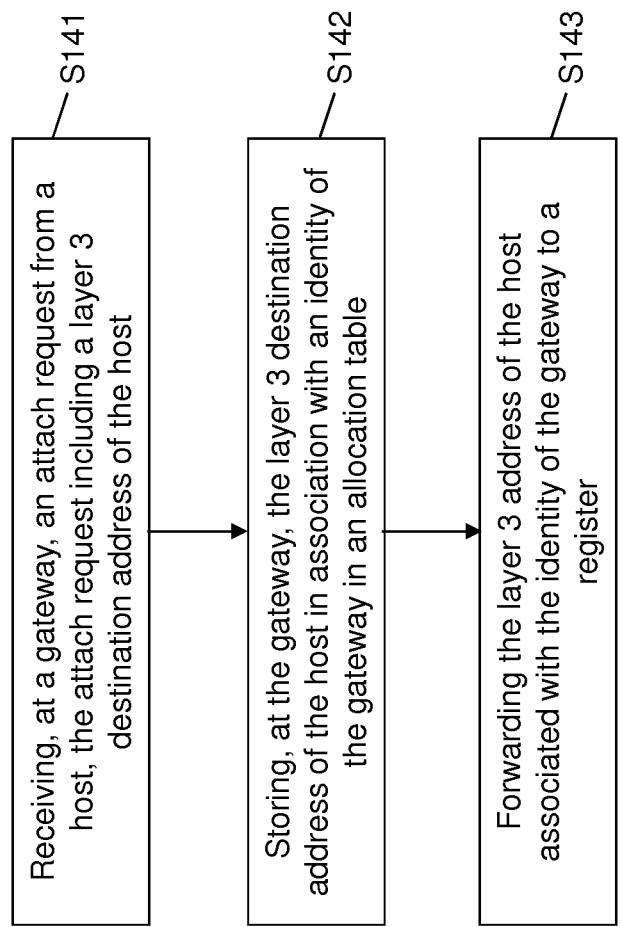
FIG. 14 is a flowchart illustrating another example of a method according to example versions of the present invention.

FIG. 14 is a flowchart illustrating another example of a method according to example versions of the present invention.

According to example versions of the present invention, the method may be implemented in a gateway, or the like. The method comprises receiving, at a gateway, in a step S141, an attach request from a host, the attach request including a layer 3 destination address of the host, storing, at the gateway, the layer 3 destination address of the host in association with an identity of the gateway in an allocation table in a step S142, and forwarding the layer 3 address of the host associated with the identity of the gateway to a register in a step S143.

According to further example version of the present invention, the method is implemented using software defined networking and the functions of the gateway are implemented as applications stored in an application database.

According to further example version of the present invention, the identity of the gateway and/or the identity of the second gateway is any one of an identity according to layer 2, an identity according to layer 3, or an identity according to multiprotocol label switching.

Figure 15:
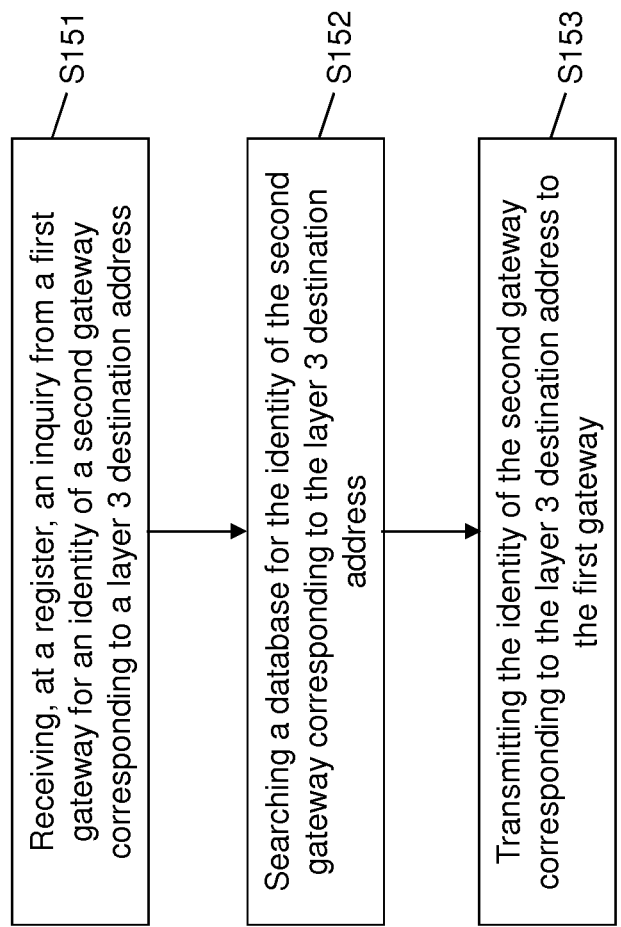
FIG. 15 is a flowchart illustrating another example of a method according to example versions of the present invention.

FIG. 15 is a flowchart illustrating another example of a method according to example versions of the present invention.

According to example versions of the present invention, the method may be implemented in a register, or the like. The method comprises receiving, at a register, in a step S151, an inquiry from a first gateway for an identity of a second gateway corresponding to a layer 3 destination address, searching, in a step S152, a database for the identity of the second gateway corresponding to the layer 3 destination address, and transmitting the identity of the second gateway corresponding to the layer 3 destination address to the first gateway in a step S153.

According to example versions of the present invention, the method further comprises retrieving, by the register, path information between the first gateway and the second gateway from a traffic engineering database, configuring a shortest path between the first gateway and the second gateway, and transmitting the path information to the first and second gateway.

Figure 16:
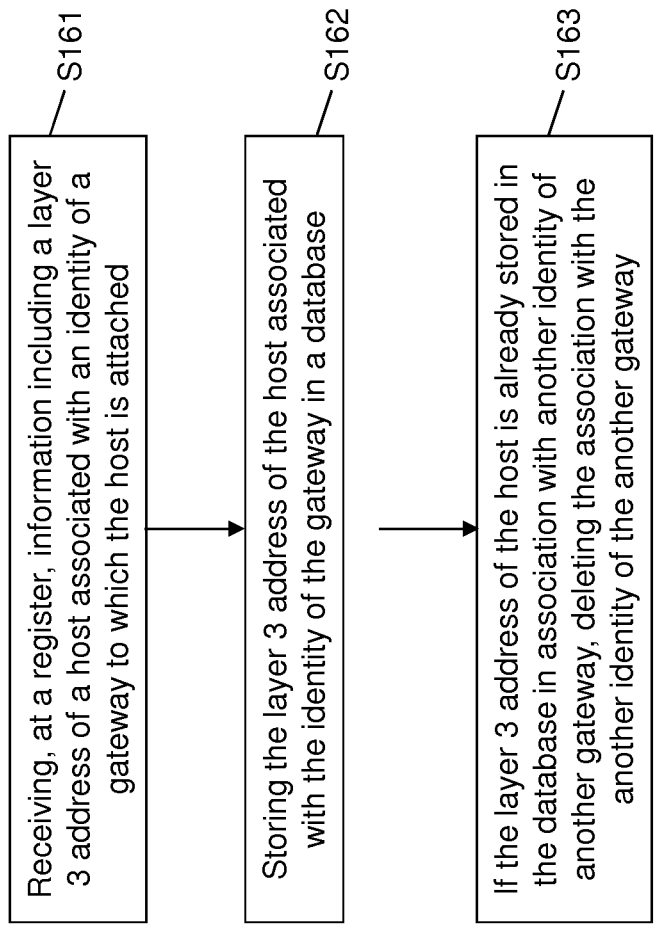
FIG. 16 is a flowchart illustrating another example of a method according to example versions of the present invention.

FIG. 16 is a flowchart illustrating another example of a method according to example versions of the present invention.

According to example versions of the present invention, the method may be implemented in a register, or the like. The method comprises receiving, at a register, in a step S161, information including a layer 3 address of a host associated with an identity of a gateway to which the host is attached, storing the layer 3 address of the host associated with the identity of the gateway in a database in a step S162, and if the layer 3 address of the host is already stored in the database in association with another identity of another gateway, deleting the association with the another identity of the another gateway in a step S163.

According to example versions of the present invention, the method is implemented using software defined networking and the functions of the register are implemented as applications stored in an application database.

According to example versions of the present invention, the identity of the gateway and/or the second gateway and/or the another gateway is any one of an identity according to layer 2, an identity according to layer 3, or an identity according to multiprotocol label switching (MPLS).

Figure 17:
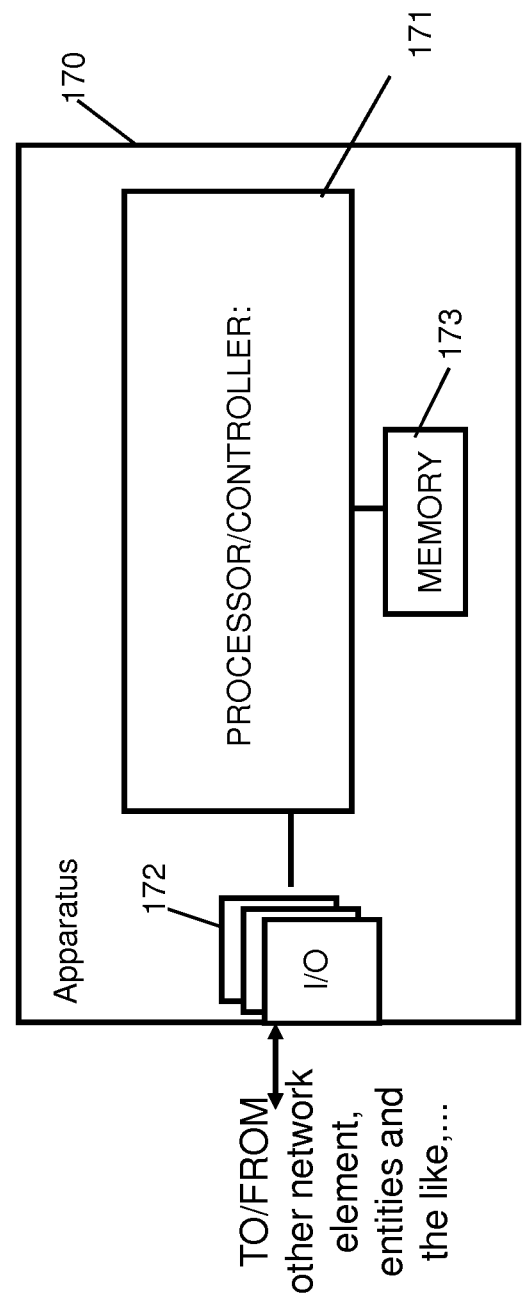
FIG. 17 is a diagram illustrating an example of an apparatus according to example versions of the present invention.

FIG. 17 is a block diagram showing an example of an apparatus according to example versions of the present invention.

In FIG. 17, a block circuit diagram illustrating a configuration of an apparatus 170 is shown, which is configured to implement the above described aspects of the invention. It is to be noted that the apparatus 170 shown in FIG. 17 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 170 may comprise a processing function or processor 171, such as a CPU or the like, which executes instructions given by programs or the like related to the flow control mechanism. The processor 171 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 172 denotes transceiver or input/output (I/O) units (interfaces) connected to the processor 171. The I/O units 172 may be used for communicating with one or more other network elements, entities, terminals or the like. The I/O units 172 may be a combined unit comprising communication equipment towards several network elements, or may comprise a distributed structure with a plurality of different interfaces for different network elements. Reference sign 173 denotes a memory usable, for example, for storing data and programs to be executed by the processor 171 and/or as a working storage of the processor 171.

The processor 171 is configured to execute processing related to the above described aspects. In particular, the apparatus 170 may be implemented in or may be part of a gateway, i.e. an AM, or the like, and may be configured to perform a method as described in connection with FIG. 13 or 14. Thus, the processor 171 is configured to perform receiving, at a first gateway, a data packet from a first host served by the first gateway destined to a second host served by a second gateway, the data packet having a header comprising a layer 3 destination address of the second host and a broadcast layer 2 destination address, searching, by the first gateway, a flow table stored in the first gateway for an identity of the second gateway associated with the broadcast layer 2 destination address, if the identity is found in the flow table, replacing the broadcast layer 2 destination address with the identity of the second gateway serving the second host, and transmitting the data packet to the second gateway.

According to further example version of the present invention, the processor 171 is further configured to perform, if the identity is not found in the flow table, searching, by the first gateway, an allocation table stored in the first gateway, for the identity of the second gateway associated with the layer 3 destination address, and, if the identity of the second gateway associated with the layer 3 destination address is found in the allocation table, storing, in the flow table, the identity of the second gateway in association with the layer 3 destination address.

According to further example version of the present invention, the processor 171 is further configured to perform, if the identity of the second gateway associated with the layer 3 destination address is not found in the table, forwarding, by the first gateway, an inquiry for the identity of the second gateway corresponding to the layer 3 destination address to a register, receiving the identity of the second gateway corresponding to the layer 3 destination address from the register, and storing the identity of the second gateway in the allocation table in association with the layer 3 destination address.

According to further example version of the present invention, the apparatus 170 may be implemented in or may be part of a gateway, i.e. an AM, or the like, and the processor 171 is further configured to perform receiving, at a gateway, an attach request from a host, the attach request including a layer 3 destination address of the host, storing, at the gateway, the layer 3 destination address of the host in association with an identity of the gateway in an allocation table, and forwarding the layer 3 address of the host associated with the identity of the gateway to a register.

According to example version of the present invention, the functions of the gateway are implemented as applications stored in an application database using software defined networking.

According to example version of the present invention, the apparatus 170 may be implemented in or may be part of a register, i.e. a CLR, or the like, and may be configured to perform a method as described in connection with FIG. 15 or 16. Thus, the processor 171 is configured to perform receiving, at the register, an inquiry from a first gateway for an identity of a second gateway corresponding to a layer 3 destination address, searching a database for the identity of the second gateway corresponding to the layer 3 destination address, and transmitting the identity of the second gateway corresponding to the layer 3 destination address to the first gateway.

According to example version of the present invention, processor 171 is further configured to perform retrieving, by the register, path information between the first gateway and the second gateway from a traffic engineering database, configuring a shortest path between the first gateway and the second gateway, and transmitting the path information to the first and second gateway.

According to further example version of the present invention, the apparatus 170 may be implemented in or may be part of a register, i.e. a CLR, or the like, and the processor 171 is further configured to perform receiving, at a register, information including a layer 3 address of a host associated with an identity of a gateway to which the host is attached, storing the layer 3 address of the host associated with the identity of the gateway in a database, and if the layer 3 address of the host is already stored in the database in association with another identity of another gateway, deleting the association with the another identity of the another gateway.

According to example version of the present invention, the functions of the register are implemented as applications stored in an application database using software defined networking.

According to example version of the present invention, the identity of the gateway and/or the second gateway and/or the another gateway is any one of an identity according to layer 2, an identity according to layer 3, or an identity according to multiprotocol label switching.

For further details regarding the functions of the apparatus 170, reference is made to the description of the methods according to example versions of the present invention as described in connection with FIGS. 13 to 16, respectively.

In the foregoing exemplary description of the apparatus, only the units/means that are relevant for understanding the principles of the invention have been described using functional blocks. The apparatus may comprise further units/means that are necessary for its respective operation, respectively. However, a description of these units/means is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the aspects/embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the aspects/embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. An apparatus for use in a first gateway, comprising:
at least one processor,
and
at least one memory for storing instructions to be executed by the processor, wherein
the at least one memory and the instructions are configured to, with the at least one processor, cause the apparatus at least to perform:
receiving, at a first gateway, a data packet from a first host served by the first gateway destined to a second host served by a second gateway, the data packet having a header comprising a layer 3 destination address of the second host and a broadcast layer 2 destination address,
searching, by the first gateway, a flow table stored in the first gateway for a layer 2 identity of the second gateway associated with the layer 3 destination address of said second host,
if the identity is found in the flow table,
replacing the broadcast layer 2 destination address with the layer 2 identity of the second gateway serving the second host, and
transmitting the data packet to the second gateway, and if the identity is not found in the flow table,
searching, by the first gateway, an allocation table stored in the first gateway, for the identity of the second gateway associated with the layer 3 destination address, and
if the identity of the second gateway associated with the layer 3 destination address is found in the allocation table,
storing, in the flow table, the identity of the second gateway in association with the layer 3 destination address.

2. The apparatus according to claim 1, wherein the at least one memory and the instructions are further configured to, with the at least one processor, cause the apparatus at least to perform:
if the identity of the second gateway associated with the layer 3 destination address is not found in the table,
forwarding, by the first gateway, an inquiry for the identity of the second gateway corresponding to the layer 3 destination address to a register, receiving the identity of the second gateway corresponding to the layer 3 destination address from the register, and storing the identity of the second gateway in the allocation table in association with the layer 3 destination address.

3. The apparatus according to claim 1, wherein
the functions of the gateway are implemented as applications stored in an application database using software defined networking.

4. An apparatus for use in a register, comprising:
at least one processor, and
at least one memory for storing instructions to be executed by the processor, wherein
the at least one memory and the instructions are configured to, with the at least one processor, cause the apparatus at least to perform:
  receiving, at a register, an inquiry from a first gateway for an identity of a second gateway corresponding to a layer 3 destination address,
  searching a database for the identity of the second gateway corresponding to the layer 3 destination address,
  transmitting the identity of the second gateway corresponding to the layer 3 destination address to the first gateway,
  retrieving, by the register, path information between the first gateway and the second gateway from a traffic engineering database,
  configuring a shortest path between the first gateway and the second gateway, and
  transmitting the path information to the first and second gateway.

5. The apparatus according to claim 4, wherein
the functions of the register are implemented as applications stored in an application database using software defined networking.

* * * * *